(12) United States Patent
Kodama et al.

(10) Patent No.: US 11,383,592 B2
(45) Date of Patent: Jul. 12, 2022

(54) MOUNTING STRUCTURE FOR DRIVE DEVICE IN SERIES HYBRID VEHICLE

(71) Applicant: TOYOTA JIDOSHA KABUSHIKI KAISHA, Toyota (JP)

(72) Inventors: Takuya Kodama, Nisshin (JP); Tomohito Ono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 16/774,145

(22) Filed: Jan. 28, 2020

(65) Prior Publication Data
US 2020/0238814 A1 Jul. 30, 2020

(30) Foreign Application Priority Data
Jan. 30, 2019 (JP) .............................. JP2019-013771

(51) Int. Cl.
| | | |
|---|---|---|
| *B60J 7/00* | (2006.01) | |
| *B60K 6/26* | (2007.10) | |
| *B60K 6/40* | (2007.10) | |
| *B60K 6/46* | (2007.10) | |
| *B62D 21/02* | (2006.01) | |
| *B62D 25/08* | (2006.01) | |
| *B60K 1/04* | (2019.01) | |

(52) U.S. Cl.
CPC .................. *B60K 6/26* (2013.01); *B60K 6/40* (2013.01); *B60K 6/46* (2013.01); *B62D 21/02* (2013.01); *B62D 25/082* (2013.01); *B60K 2001/0411* (2013.01)

(58) Field of Classification Search
CPC ........ A61P 11/00; A61P 35/00; H04L 5/0048; H04L 5/0051; H04W 24/10; G02B 15/173; G02B 15/177; G02B 15/143103; G02B 15/163; G02B 27/646
See application file for complete search history.

(56) References Cited

U.S. PATENT DOCUMENTS

2003/0047362 A1* 3/2003 Chernoff ................. B60T 1/065
180/65.245
2010/0307844 A1* 12/2010 Peters .................. B62D 31/003
180/60

(Continued)

FOREIGN PATENT DOCUMENTS

JP 2013-035443 A 2/2013

*Primary Examiner* — Kiran B Patel
(74) *Attorney, Agent, or Firm* — Hunton Andrews Kurth LLP

(57) ABSTRACT

A mounting structure for a drive device includes: a power generation unit having an engine and a generator driven by the engine to generate electric power; and a drive unit having a motor for traveling and a power transmission mechanism that outputs torque from the motor toward a driving wheel. A frame member of a vehicle body is provided inside an engine compartment. The power generation unit and the drive unit are arranged, inside the engine compartment, side by side in a width direction of a vehicle so as not to contact each other, and are each connected to the frame member via a mount member. Portions of the power generation unit and the drive unit, which are close to each other in the width direction, are connected by a connecting member having an anti-vibration elastic body.

6 Claims, 5 Drawing Sheets

(56) References Cited

U.S. PATENT DOCUMENTS

| | | | |
|---|---|---|---|
| 2013/0264132 A1* | 10/2013 | Fujiwara | B60K 6/46 180/65.245 |
| 2015/0252721 A1* | 9/2015 | Yamada | B60K 13/04 123/2 |
| 2016/0031310 A1* | 2/2016 | Swales | B60K 6/48 903/905 |
| 2020/0139841 A1* | 5/2020 | Ono | B60L 50/10 |
| 2020/0238814 A1* | 7/2020 | Kodama | B62D 21/02 |

* cited by examiner

MOUNTING STRUCTURE FOR DRIVE DEVICE IN SERIES HYBRID VEHICLE

INCORPORATION BY REFERENCE

The disclosure of Japanese Patent Application No. 2019-013771 filed on Jan. 30, 2019 including the specification, drawings and abstract is incorporated herein by reference in its entirety.

BACKGROUND

1. Technical Field

The disclosure relates to a mounting structure for a drive device in a series hybrid vehicle.

2. Description of Related Art

A series hybrid drive system is a system in which a generator is driven by an engine to generate electric power and the generated electric power is supplied a motor for traveling so that a vehicle travels using a drive force of the motor for traveling. The engine and the generator constitute a so-called power generation unit. The motor for traveling and a mechanism that transmits the drive force output from the motor for traveling to an axle constitute a so-called drive unit. The power generation unit and the drive unit are mechanically separate units, and only required to be electrically connected to each other.

When mounted on a vehicle, the power generation unit and the drive unit may be disposed collectively in a front part or a rear part of a compartment (front compartment or rear compartment) of the vehicle, depending on restrictions or requirements regarding space. One example of the above is described in Japanese Unexamined Patent Application Publication No. 2013-35443 (JP 2013-35443 A). In an apparatus described in JP 2013-35443 A, a power generation device including an engine and a generator driven by the engine, and a drive device including a motor and a differential gear are arranged, in an engine compartment, side by side in a front-rear direction of the vehicle. Inside the engine compartment, a pair of right and left side members are provided, and a subframe connected to the side members so as to connect the side members to each other are provided on a rear part of the engine compartment in the vehicle front-rear direction. The drive device is arranged rearward of the power generation device in the vehicle front-rear direction. Right and left ends of the drive device (both ends in a width direction of the vehicle) are attached to the right and left side members with mount portions, and an intermediate portion of the drive device (intermediate portion in the width direction) is attached to the subframe with a mount portion. The power generation device is attached to the side members such that two portions on one side in the width direction are attached to one of the side members with mount portions and one portion on the other side is attached to the other side member with a mount portion. That is, the drive device and the power generation device are attached to the right and left side members and the subframe with the mount portions.

The mount portions are members similar to members used for attaching a power source such as an engine to a vehicle body. The mount portion has a configuration in which a fixed part attached to the vehicle body such as the side member and a moving part attached to a mounted member such as the drive device are connected by an elastic body such as an anti-vibration rubber. The power generation device including the engine and the drive device mainly composed of the motor have different vibration characteristics or degrees. In the mounting structure described in JP 2013-35443 A, the power generation device and the drive device are separately formed and are connected to the vehicle body with different mount members. Therefore, it is possible to set vibration isolation characteristics suitable for each device. Also, by setting an elastic modulus of the mount members for the drive device large, it is possible to improve drive characteristics of the vehicle.

SUMMARY

In the configuration described in JP 2013-35443 A, the drive device and the power generation device are arranged side by side in the front-rear direction of the vehicle. Therefore, a region or a length, in the engine compartment, occupied by the devices in the front-rear direction of the vehicle is large. Thus, taking a deformable space (crushable zone) for collision, which is required in the engine compartment, into consideration, the length of the engine compartment tends to be long, and consequently the vehicle cabin tends to be narrow or a total length of the vehicle tends to be long. In addition, in the configuration described in JP 2013-35443 A, each of the drive device and the power generation device requires a length longer than a distance between the right and left side members, or long brackets are required to connect each device and the corresponding side member. Thus, a casing of each device may become large or parts required for mounting may become large, and the weight of the vehicle may increase accordingly.

The disclosure provides a mounting structure for a drive device in a series hybrid vehicle, which allows a power generation unit and a drive unit constituting the drive device to be compactly mounted in an engine compartment without impairing vibration isolation characteristics.

One aspect of the disclosure relates to a mounting structure for a drive device in a series hybrid vehicle. The drive device includes: a power generation unit, and a drive unit. The power generation unit includes an engine and a generator that is driven by the engine to generate electric power. The drive unit includes a motor for traveling, which is supplied with the electric power to output a drive force for traveling, and a power transmission mechanism that outputs torque from the motor for traveling toward a driving wheel. In the mounting structure, a frame member of a vehicle body is provided inside an engine compartment. The power generation unit and the drive unit are arranged, inside the engine compartment, side by side in a width direction of the series hybrid vehicle so as not to contact each other, and are each connected to the frame member via a mount member. A portion of the power generation unit and a portion of the drive unit, which are close to each other in the width direction, are connected by a connecting member having an anti-vibration elastic body.

In the mounting structure according to the above aspect, the power generation unit may include a casing that houses the generator and protrudes toward the drive unit, the power generation unit may be arranged with the casing extending above the drive unit, and the connecting member may connect the casing and the drive unit.

In the mounting structure of the above aspect, one unit, out of the power generation unit and the drive unit, may be attached to the frame member via the mount member at three locations that are not positioned on a single straight line in a plan view. The other unit, out of the power generation unit and the drive unit, may be attached to the frame member via the mount member at two predetermined locations. The connecting member may be arranged on a straight line connecting any two locations, out of the three locations at which the one unit is attached to the frame member via the mount member.

In the mounting structure according to the above aspect, the frame member may include a first cross member and a second cross member that are arranged so as to extend in the width direction of the series hybrid vehicle and to be spaced apart from each other in a front-rear direction of the series hybrid vehicle. The one unit may be the drive unit. The two locations at which the one unit is attached to the frame member may include a location at which the drive unit is attached to the first cross member and a location at which the drive unit is attached to the second cross member.

In the mounting structure of the above aspect, one unit, out of the power generation unit and the drive unit, may be attached to the frame member via the mount member at three locations that are not positioned on a single straight line in a plan view. The other unit, out of the power generation unit and the drive unit, may be attached to the frame member via the mount member at two predetermined locations. The connecting member may be arranged on a straight line connecting a position of a center of gravity of the other unit and one of the two predetermined locations, and inside a triangle defined by the three locations that are not positioned on the single straight line in the plan view.

In the mounting structure according to the above aspect, the frame member may include a first cross member and a second cross member that are arranged so as to extend in the width direction of the series hybrid vehicle and to be spaced apart from each other in a front-rear direction of the series hybrid vehicle, and a pair of side members arranged so as to extend in the front-rear direction of the series hybrid vehicle and to be spaced apart from each other in the width direction. The one unit may be the drive unit. The other unit may be the power generation unit. The three locations at which the one unit is attached to the frame member may include a location at which the drive unit is attached to the first cross member, a location at which the drive unit is attached to the second cross member, and a location at which the drive unit is attached to one side member out of the pair of side members. The two predetermined locations at which the other unit is attached to the frame member may include a location at which the power generation unit is attached to one of the first cross member and the second cross member and a location at which the power generation unit is attached to the other side member out of the pair of side members. The straight line may be a line connecting a location at which the power generation unit is attached to one of the side members and the center of gravity.

In the mounting structure of the above aspect, the power generation unit including the engine and the generator and the drive unit including the motor for traveling, which generates a drive force for traveling, are arranged, inside the engine compartment, side by side in the width direction of the series hybrid vehicle. Therefore, it is possible to reduce a space required for housing the power generation unit and the drive unit in the front-rear direction of the vehicle. In other words, it is possible to secure a so-called crushable zone for absorbing a load applied at the time of collision without increasing a size of the engine compartment or the vehicle in the front-rear direction. The power generation unit and the drive unit are connected by the connecting member at their portions that are close to each other, namely, the portions close to a center of the vehicle in the width direction. Therefore, one of the units serves as a support member for connecting the other unit to the frame member and supporting the other unit, or has a function to connect the other unit to the frame member. Thus, it is not necessary to make the casing or housing of the other unit so large to reach the frame member, and not necessary to use a large bracket for connecting the other unit to the frame member, thereby suppressing increase in size and weight of the drive device or the vehicle. In addition, it is possible to secure support strength for each unit, which enables both improvement in vibration isolation characteristics and improvement in vehicle dynamics.

In a configuration disclosed as an example of the above aspect, the connecting member is interposed between the drive unit and the casing that houses the generator and protrudes toward the drive unit. The casing is a part of the power generation unit, which is distant from the location at which the power generation unit is connected to the frame member, and is a part that is largely displaced by vibration of the power generation unit. The casing is supported by the drive unit via the connecting member. As a result, interference, such as contact or abutment, between the power generation unit and the drive unit can be reliably suppressed.

In a configuration disclosed as an example of the above aspect, when the other unit such as the power generation unit is displaced by vibration or the like, a reaction force against the displacement acts on the one unit such as the drive unit via the connecting member. In the above aspect, a portion on which the reaction force acts is a portion on the straight line connecting the two locations out of the three locations at which the one unit is connected to the frame member. Therefore, almost no moment occurs to rotate the one unit around the straight line. As a result, it is possible to reduce a load applied to the other location out of the three locations at which the one unit is attached to the frame member and a load applied to the mount member at that other location. That is, since vibration of the one unit is not promoted, vibration isolation characteristics are improved and the one unit can be stably supported.

Further, in a configuration disclosed as an example of the above aspect, the connecting member that supports the other unit such as the power generation unit substantially with the frame member is arranged on the straight line connecting the center of gravity of the other unit and one predetermined location at which the other unit is connected to the frame member via the mount member and inside the triangle defined by the three locations at which the one unit such as the drive unit is supported at three points. Thus, the other unit such as the power generation unit is supported at its center of gravity by the connecting member and the one predetermined location. Further, a position to which the load is applied to the one unit via the connecting member is close to the center of gravity of the one unit. Therefore, the change in behavior or posture of the other unit when being displaced by vibration or the like is simplified. That is, the other unit is stably supported, and its vibration isolation characteristics are improved. In addition, the load applied to the one unit from the other unit is distributed to and received by the three locations, at which the one unit is supported, almost or nearly equally, so that the one unit is stably supported and its vibration isolation characteristics are improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
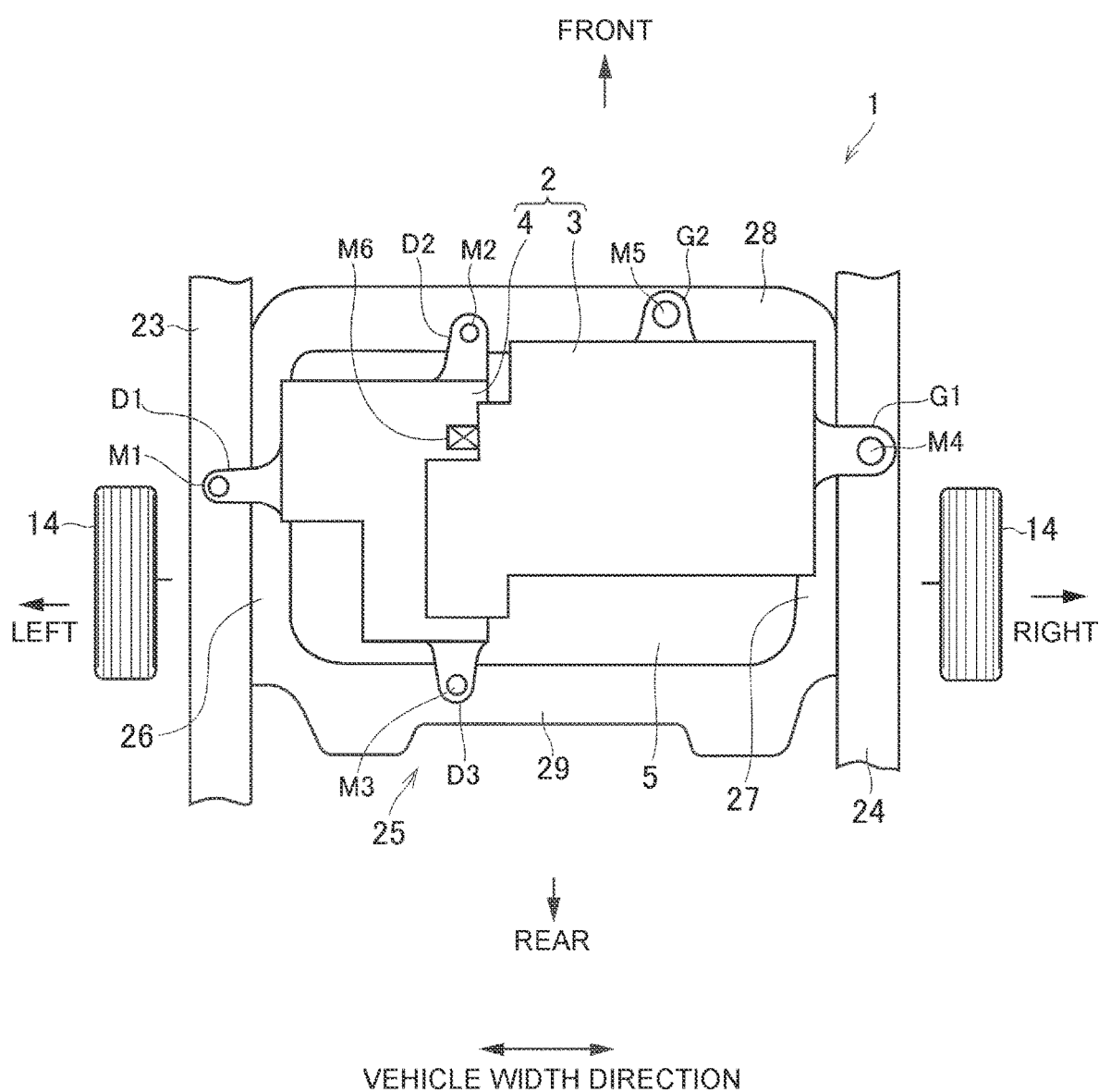
FIG. 1 is a schematic diagram showing a power generation unit and a drive unit arranged in an engine compartment as viewed in a plan view.

A vehicle in an embodiment of the disclosure is a series hybrid vehicle 1 and includes, as a drive device 2, a power generation unit 3 that generates electric power and a drive unit 4 that generates a drive force for traveling. FIG. 1 schematically shows the drive device 2 mounted in the vehicle 1, and is a view of an engine compartment 5 in which the drive device 2 is disposed, as viewed from above (in a plan view). An upper side in FIG. 1 represents a front side of the vehicle 1, a lower side in FIG. 1 represents a rear side of the vehicle 1, a right side in FIG. 1 represents a right side of the vehicle 1, and a left side in FIG. 1 represents a left side of the vehicle 1.

Figure 2:
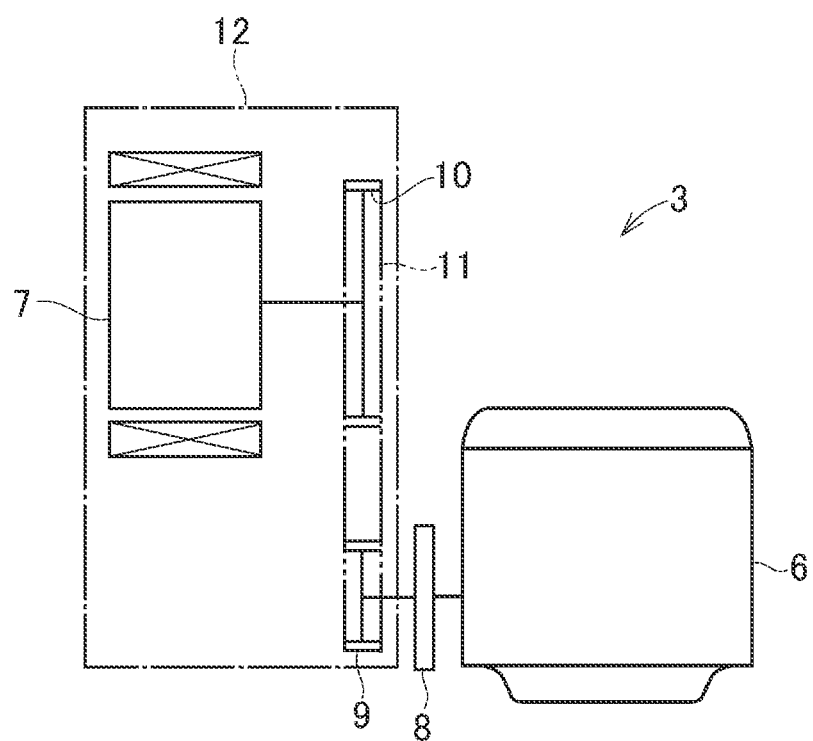
FIG. 2 is a block diagram illustrating a configuration of the power generation unit.
Figure 3:
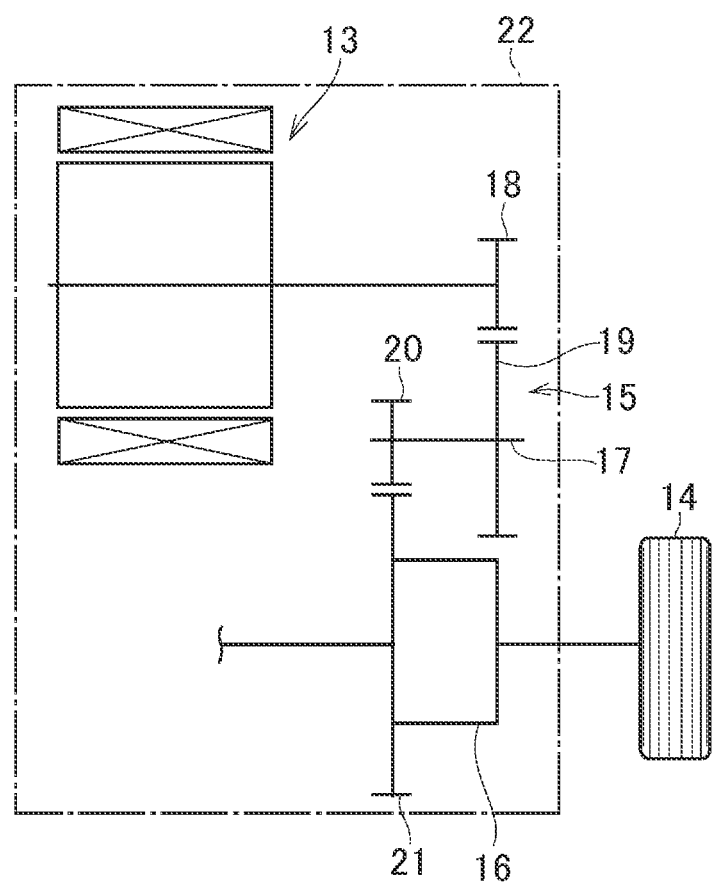
FIG. 3 is a block diagram illustrating a configuration of the drive unit.

The power generation unit 3 is shown in FIG. 2, and the drive unit 4 is shown in FIG. 3. The power generation unit 3 is configured to drive a generator 7 with an engine 6. The engine 6 is an internal combustion engine that generates a drive force by burning fuel, and may be a gasoline engine, a diesel engine, or the like. The generator 7 can be formed of a so-called motor generator having a power generation function to generate electric power by being rotated by the engine 6 and a function as a motor that consumes electric power to output torque. In such a configuration, the engine 6 can be started by motoring with the generator 7. The engine 6 and the generator 7 are connected by a winding power transmission mechanism, a gear mechanism, or the like. In an example shown in FIG. 2, a driving sprocket 9 is attached to an output shaft of the engine 6 via a damper 8, and a driven sprocket 10 is attached to a rotating shaft (or rotor shaft) of the generator 7. A chain 11 is wound around the sprockets 9, 10. That is, the engine 6 and the generator 7 are connected by a chain drive mechanism. The generator 7, the chain drive mechanism, and the like are attached to an engine block to be integrated with the engine 6 while being housed in a predetermined casing 12. Thus, the engine 6, the generator 7, the chain drive mechanism, and the like are configured as a single unit as a whole.

The drive unit 4 includes a motor for traveling (hereinafter sometimes simply referred to as "motor") 13 that outputs torque for traveling, and a power transmission mechanism (or speed reduction mechanism) 15 that transmits the torque output from the motor 13 to driving wheels 14. The motor 13 is a drive device that outputs torque for traveling, but preferably regenerates energy during deceleration. Therefore, the motor 13 is formed of a motor (motor generator) having a power generation function, such as a permanent magnet synchronous motor. The power transmission mechanism 15 includes a differential gear 16 that is a final reduction gear that transmits torque to the right and left driving wheels 14. Thus, the drive unit 4 has a configuration similar to that of a transaxle used in a known vehicle. In an example shown in FIG. 3, the motor 13 and the differential gear 16 are connected by a gear-type speed reduction mechanism. That is, a counter shaft 17 is arranged in parallel with an output shaft (rotor shaft) of the motor 13, and the drive gear 18 attached to the output shaft (rotor shaft) of the motor 13 meshes with a counter-driven gear 19 attached to the counter shaft 17. A counter drive gear 20 is attached to the counter shaft 17, and the counter drive gear 20 meshes with a ring gear 21 of the differential gear 16. The motor 13, the power transmission mechanism 15, and the differential gear 16 are integrated and housed in a predetermined housing 22. Thus, the motor 13, the power transmission mechanism 15, and the differential gear 16 are configured as a single unit as a whole. The generator 7 and the motor 13 are electrically connected via a power storage device and a controller having an inverter, etc. (both not shown).

The engine compartment 5 in which the drive device 2 is disposed is housing space that is isolated from a cabin (not shown) and formed at a front part or a rear part of the vehicle 1. FIG. 1 shows an example in which the engine compartment 5 is formed at the front part. The engine compartment 5 is provided with a pair of right and left side members 24, 23 included in a frame member of the vehicle body. A subframe 25 having a frame shape is disposed at a lower position in the engine compartment 5. The subframe 25 is connected to the side members 24, 23 to form the frame member. The subframe 25 has a pair of right and left lateral members 27, 26 and a pair of front and rear cross members 28, 29. The lateral members 27, 26 extend in the front-rear direction of the vehicle 1 so as to be substantially parallel to the side members 24, 23. The cross members 28, 29 extend in a width direction of the vehicle 1 so as to connect respective front ends of the lateral members 27, 26 and connect respective rear ends of the lateral members 27, 26.

Figure 4:
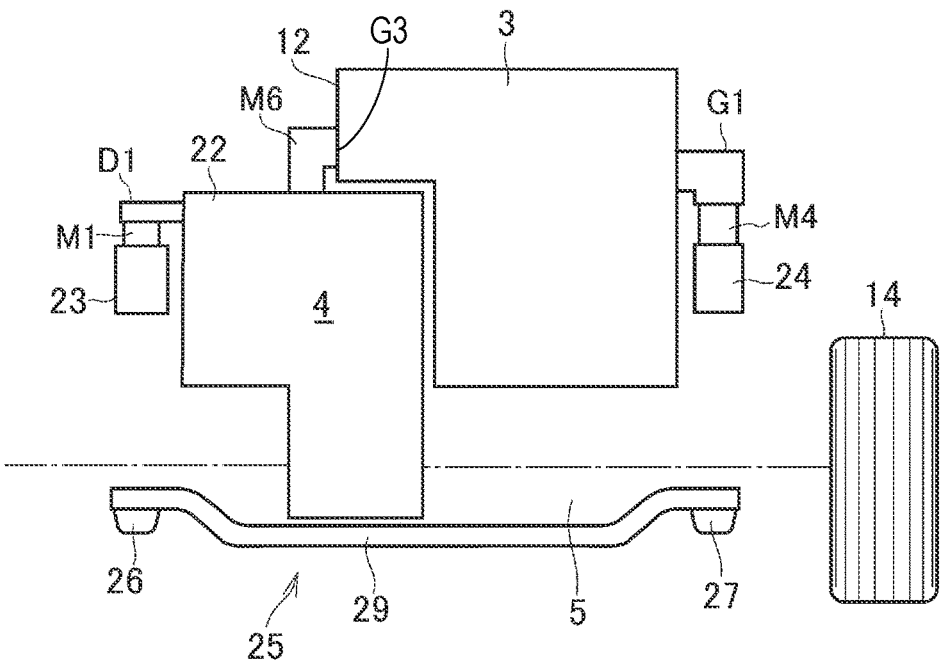
FIG. 4 is a schematic diagram showing the power generation unit and the drive unit arranged in the engine compartment as viewed from a rear side of the vehicle.
Figure 5:
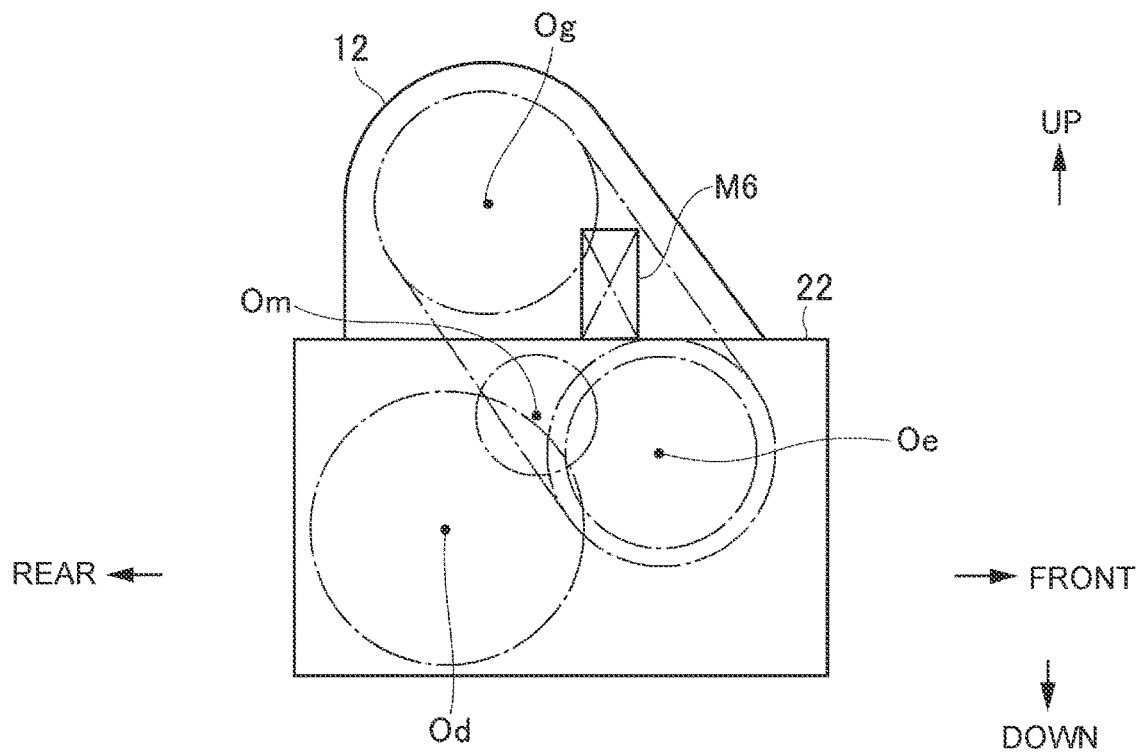
FIG. 5 is an arrangement diagram showing relative positions of an engine, a generator, a differential gear, and a motor with their rotation center axes.

The power generation unit 3 and the drive unit 4 are arranged side by side in the width direction of the vehicle 1 between the right and left side members 24, 23. The relative positions of the power generation unit 3 and the drive unit 4 in an arranged state are schematically shown in FIG. 1, FIG. 4 and FIG. 5. In the example shown in these drawings, the casing 12 housing the generator 7 in the power generation unit 3 protrudes, above the engine 6, in a direction in which a rotation center axis of the engine 6 extends, more specifically, in the width direction of the vehicle 1, toward a center of the vehicle 1. In the drive unit 4, the differential gear 16 is disposed more toward the center of the vehicle 1 in the width direction than the motor 13 and obliquely below the motor 13. Therefore, an outline of the drive unit 4 as a whole has a shape in which a central portion in the width direction of the vehicle 1 bulges toward the bottom of the vehicle 1. Therefore, an end of the power generation unit 3 on the center side in the width direction of the vehicle 1 is positioned close to an end of the drive unit 4 on the center side in the width direction with a light clearance provided therebetween. In such a non-contact state, the casing 12 housing the generator 7 extends above the drive unit 4 with a slight clearance provided above the drive unit 4. That is, the power generation unit 3 and the drive unit 4 partially overlap in a vertical direction (vertical direction in FIG. 4).

The drive unit 4 is attached to the frame member at three locations on its outer periphery. The drive unit 4 is provided with an attachment portion D1 at a location that is close to the side member 23 serving as one side member. The drive unit 4 is attached to the side member 23 with a mount member M1 provided between the attachment portion D1 and the side member 23. The drive unit 4 is also provided with an attachment portion D2 on the center side in the width direction of the vehicle 1 at a location that is close to the front cross member 28 serving as a first cross member. The drive unit 4 is attached to the front cross member 28 with a mount member M2 provided between the attachment portion D2 and the front cross member 28. An attachment portion D3 is provided on the substantially opposite side of the drive unit 4 from the attachment portion D2 in the front-rear direction of the vehicle 1. The drive unit 4 is attached to the rear cross member 29 serving as a second cross member, with a mount member M3 provided between the attachment portion D3 and the cross member 29.

The power generation unit 3 is attached to the frame member at two locations on its outer periphery. The power generation unit 3 is provided with an attachment portion G1 at a location that is close to the side member 24 serving as the other side member. The power generation unit 3 is attached to the side member 24 with a mount member M4 provided between the attachment portion G1 and the side member 24. The power generation unit 3 is also provided with an attachment portion G2 on the center side in the width direction of the vehicle 1 at a location that is close to the front cross member 28. The power generation unit 3 is attached to the front cross member 28 with a mount member M5 provided between the attachment portion G2 and the front cross member 28.

Further, the power generation unit 3 is provided with a third attachment portion G3 that is attached to the frame member via the drive unit 4. The third attachment portion G3 is a portion of the power generation unit 3 on the center side in the width direction of the vehicle 1, such as an outer surface of the casing 12 housing the generator 7. The power generation unit 3 is attached to the drive unit 4 with a connecting member M6 provided between the third attachment portion G3 and the drive unit 4 (specifically, the housing 22). In other words, since the drive unit 4 is attached to the frame member as described above, the third attachment portion G3 of the power generation unit 3 is attached to the frame member via the drive unit 4.

Here, the relative positions of the engine 6, the generator 7, the motor 13 and the like in the drive device 2 attached to the frame member as described above will be briefly described. The positions of the engine 6 and the generator 7 are determined such that a rotation center axis Og of the generator 7 is positioned rearward and obliquely upward of a rotation center axis Oe of the engine 6. Further, the position of the differential gear 16 is determined such that a rotation center axis Od of the differential gear 16 is positioned almost immediately below the rotation center axis Og of the generator 7 and rearward of the rotation center axis Oe of the engine 6. The position of the motor 13 is determined such that a rotation center axis Om of the motor 13 is positioned slightly upward of a straight line connecting the rotation center axis Oe of the engine 6 and the rotation center axis Od of the differential gear 16 and between the rotation center axes Oe and Od.

The mount members M1 to M5 with which the power generation unit 3 and the drive unit 4 are attached to the frame member may have the same configuration as that of mount members with which an engine is attached to a frame member constituting a vehicle body in a known general vehicle. That is, the mount members are each formed by connecting, with an anti-vibration elastic body such as an anti-vibration rubber, a fixed piece that is attached to the frame member and a movable piece that is attached to a movable member such as an engine. Various mount members may be adopted as necessary. Examples of the mount members include: a structure in which an anti-vibration elastic body is disposed on a fixed piece and a movable piece is placed on the anti-vibration elastic body; a structure in which an anti-vibration elastic body is attached to a fixed piece and a shaft-shaped or pin-shaped movable piece is held by the anti-vibration elastic body; a structure in which a columnar anti-vibration elastic body is held by a movable piece and a shaft passing through the anti-vibration elastic body is held by a fixed piece; and so forth.

Figure 6:
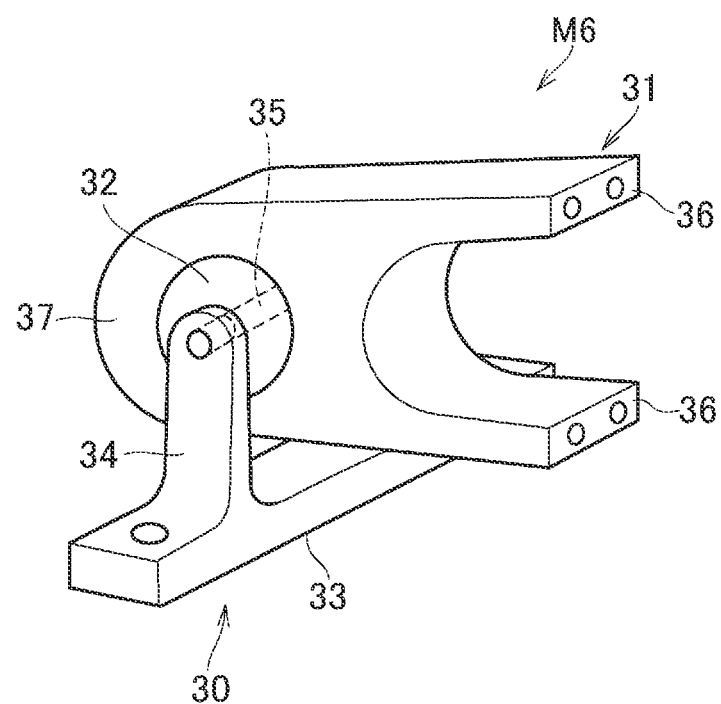
FIG. 6 is a perspective view showing an example of a connecting member.

The connecting member M6 connecting the power generation unit 3 and the drive unit 4 may have substantially the same configuration as that of the mount members and an example thereof is schematically shown in FIG. 6. The connecting member M6 shown in FIG. 6 is configured by connecting a fixed piece 30 and a movable piece 31 with an anti-vibration elastic body 32 such as an anti-vibration rubber. The fixed piece 30 includes: a base 33 attached to the drive unit 4; a pair of support columns 34 provided on the base 33; and a shaft portion 35 supported at its both ends by the support columns 34. The movable piece 31 has receiving portions 36 forming a bifurcation and attached to the power generation unit 3 and a base portion 37 that connects the receiving portions 36. The anti-vibration elastic body 32 such as a columnar anti-vibration rubber is fitted in the base portion 37. The shaft portion 35 of the fixed piece 30 passes through the anti-vibration elastic body 32. Thus, the fixed piece 30 and the movable piece 31 are connected via the anti-vibration elastic body 32. The fixed piece 30 is attached to the drive unit 4, the drive unit 4 is attached to the cross members 28, 29 and the side member 23, and the receiving portions 36 are attached to the power generation unit 3, so that the power generation unit 3 is connected to and supported by the frame member via the anti-vibration elastic body 32 and further, via the drive unit 4. In addition, the connecting member M6 having the structure shown in FIG. 6 can receive loads in three axial directions that are perpendicular with one another, i.e., the vertical direction, the front-rear direction, and the lateral direction. Thus, the connecting member M6 perform vibration isolation in these three axial directions.

In the mounting structure for the drive device 2 as described above, the portions of the power generation unit 3 and the drive unit 4 on the center side in the width direction of the vehicle 1 are connected via the anti-vibration elastic body 32. Therefore, the power generation unit 3 and the drive unit 4 can be arranged side by side in the width direction of the vehicle 1 and can be securely supported by the frame member constituting the vehicle body. Thus, a space occupied by the power generation unit 3 and the drive unit 4 in the front-rear direction of the vehicle 1 can be reduced. Accordingly, a crushable zone that absorbs an impact caused at the time of collision of the vehicle 1 in the front-rear direction can be sufficiently secured, or the flexibility of design considering the crushable zone is improved. Although the power generation unit 3 and the drive unit 4 are connected by the connecting member M6, the other parts are arranged with a clearance therebetween so as to be independent of each other. Thus, an elastic modulus of the anti-vibration elastic body 32 in the mount members M4, M5 and the connecting member M6 for the power generation unit 3 is made smaller than that of the mount members M1, M2, M3 for the drive unit 4, which facilitates elastic deformation. As a result, it is possible to improve the vibration isolation characteristics of the power generation unit 3 having a large vibratory force, while increasing support strength for the drive unit 4 to improve vehicle dynamics at the time of acceleration, etc.

In the above embodiment, the casing 12 housing the generator 7 in the power generation unit 3 protrudes toward the drive unit 4. Therefore, when the power generation unit 3 vibrates with the attachment portion G1 for the side member 24 and the attachment portion G2 for the front cross member 28 serving as fixed points, the amount of displacement of the casing 12 increases. Since the connecting member M6 connects the power generation unit 3 and the drive unit 4 at the location where the amount of displacement is large, it is possible to reliably suppress interference such as contact between the power generation unit 3 and the drive unit 4. Furthermore, the connecting member M6 also functions as a third mount member that connects the power generation unit 3 to the frame member. This eliminates the need for a long bracket for connecting the power generation unit 3 to the frame member, and accordingly facilitates reduction in size and weight of the drive device 2, and therefore facilitates reduction in weight of the vehicle 1.

Figure 7:
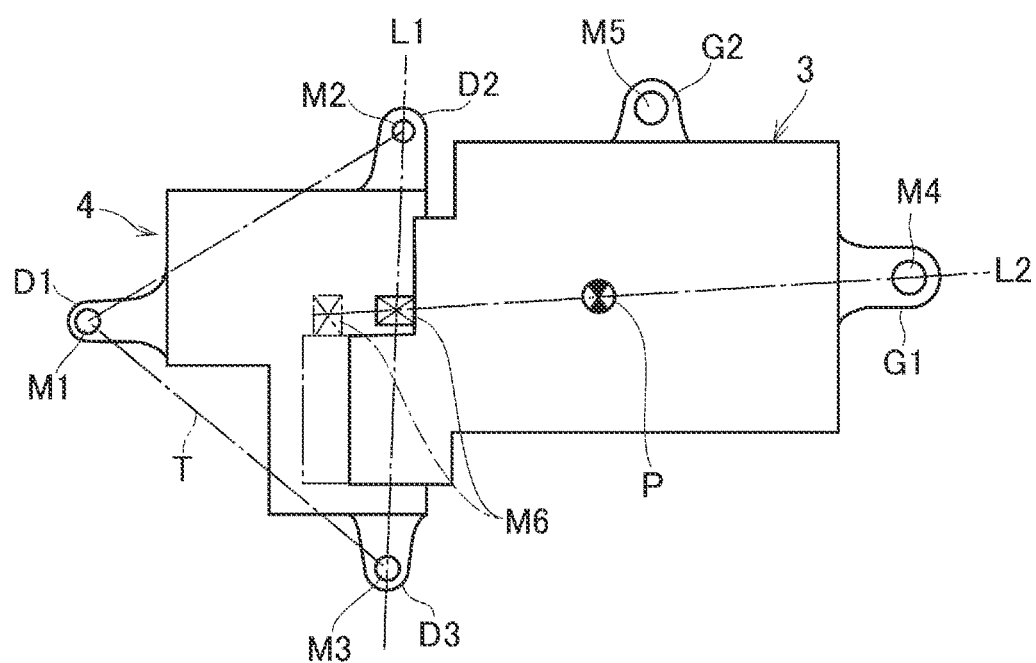
FIG. 7 is an explanatory diagram illustrating an example of a position where the connecting member is arranged.

Next, an arrangement of the connecting member M6 in consideration of the vibration isolation characteristics will be described. When the power generation unit 3 vibrates due to, for example, operation of the engine 6, a load in the vertical direction mainly acts on the drive unit 4 via the connecting member M6. The load is received by the mount members M1 to M3 via the housing 22 of the drive unit 4. As shown in FIG. 7, a straight line L1 can be assumed that connects the two mount members M2, M3, out of the mount members M1 to M3, for attaching the drive unit 4 to the cross members 28, 29, that is, the two locations at which the drive unit 4 is connected to the frame member. Further, another straight line L2 can be assumed that connects a position P of the center of gravity of the power generation unit 3 and the mount member M4 on the opposite side of the position P from the straight line L1, i.e., the location at which the power generation unit 3 is attached to the side member 24. The connecting member M6 may be attached to the drive unit 4 on an intersection of the straight lines L1 and L2. In other words, the connecting member M6 is disposed on the straight line L1. With such a configuration, the load applied from the power generation unit 3 to the drive unit 4 is received by the mount members M2, M3 on the cross members 28, 29, respectively. In other words, almost no moment to push down or pull up the mount member M1 on the side member 23 occurs. Therefore, behavior or vibration of the drive unit 4 due to the load applied from the power generation unit 3 to the drive unit 4 is simplified, and as a result, vibration damping performance of the drive device 2 as a whole is improved.

Further, as shown in FIG. 7, a triangle T connecting the three locations at which the drive unit 4 is connected to the frame member, that is, the three mount members M1 to M3 (triangle in a plan view when the drive device 2 is viewed from above) can be assumed. This is because the mount members M1 to M3 are not positioned on a single straight line in a plan view. The connecting member M6 may be arranged on the straight line L2 and inside the triangle T. The position of the connecting member M6 is indicated by broken lines in FIG. 7. With such a configuration, a point of action of the load acting on the drive unit 4 due to the vibration of the power generation unit 3 is close to a geometric center of the triangle T. As a result, the loads acting on the mount members M1 to M3 positioned on vertices of the triangle T are equalized. Thus, even if the elastic moduli of the mount members M1 to M3 are set to be equal to each other, the amounts of deflection of the mount members M1 to M3 approximate, that is, displacement or vibration of the drive unit 4 is simplified, which improves the vibration damping performance of the drive device 2 as a whole.

The disclosure is not limited to the structure described in the embodiment above. The connecting member according to the disclosure only needs to be configured to connect the power generation unit and the drive unit arranged side by side in the width direction of the vehicle at their respective portions on the center side in the width direction of the vehicle via the anti-vibration elastic body. Thus, instead of the configuration in which the drive unit and the casing that houses the generator are connected by the connecting member, a configuration may be adopted in which parts other than the casing, such as a cylinder block of the engine, and the drive unit are connected by the connecting member. For example, the generator may be arranged such that the rotation center axes of the generator and the engine are parallel to each other, rather than arranged so as to protrude in the direction of the rotation center axis of the engine. In such a configuration, the connecting member only needs to be arranged to connect the engine and the drive unit. In the above embodiment, the drive unit is attached to the frame member at the three locations, while the power generation unit is attached to the frame member at the two locations, and a third location of the power generation unit is connected to the drive unit by the connecting member. In the disclosure, instead of the above configuration, a configuration may be adopted in which the power generation unit is attached to the frame member at three locations and the drive unit is connected to the power generation unit at its third location by the connecting member. In the disclosure, the frame member to which the power generation unit and the drive unit are attached is not limited to the side members and the subframe described above, and may be an appropriate frame member, regardless of its designation, which is suitable for the structure of the vehicle body.

What is claimed is:

1. A mounting structure for a drive device in a series hybrid vehicle, the drive device including a power generation unit, and a drive unit, the power generation unit including an engine and a generator that is driven by the engine to generate electric power, the drive unit including a motor for traveling, which is supplied with the electric power to output a drive force for traveling, and a power transmission mechanism that outputs torque from the motor for traveling toward a driving wheel, the mounting structure comprising:

a frame member of a vehicle body is provided inside an engine compartment;

the power generation unit and the drive unit are arranged, inside the engine compartment, side by side in a width direction of the series hybrid vehicle so as not to contact each other, and are each connected to the frame member via a mount member; and a portion of the power generation unit and a portion of the drive unit, which are close to each other in the width direction, are connected by a connecting member having an anti-vibration elastic body.

2. The mounting structure according to claim 1, wherein:

the power generation unit includes a casing that houses the generator and protrudes toward the drive unit;

the power generation unit is arranged with the casing extending above the drive unit; and the connecting member connects the casing and the drive unit.

3. The mounting structure according to claim 1, wherein:
one unit, out of the power generation unit and the drive unit, is attached to the frame member via the mount member at three locations that are not positioned on a single straight line in a plan view;
the other unit, out of the power generation unit and the drive unit, is attached to the frame member via the mount member at two predetermined locations; and
the connecting member is arranged on a straight line connecting any two locations, out of the three locations at which the one unit is attached to the frame member via the mount member.

4. The mounting structure according to claim 3, wherein:
the frame member includes a first cross member and a second cross member that are arranged so as to extend in the width direction of the series hybrid vehicle and to be spaced apart from each other in a front-rear direction of the series hybrid vehicle;
the one unit is the drive unit; and
the two locations at which the one unit is attached to the frame member includes a location at which the drive unit is attached to the first cross member and a location at which the drive unit is attached to the second cross member.

5. The mounting structure according to claim 1, wherein:
one unit, out of the power generation unit and the drive unit, is attached to the frame member via the mount member at three locations that are not positioned on a single straight line in a plan view;
the other unit, out of the power generation unit and the drive unit, is attached to the frame member via the mount member at two predetermined locations; and
the connecting member is arranged on a straight line connecting a position of a center of gravity of the other unit and one of the two predetermined locations, and inside a triangle defined by the three locations that are not positioned on the single straight line in the plan view.

6. The mounting structure according to claim 5, wherein:
the frame member includes a first cross member and a second cross member that are arranged so as to extend in the width direction of the series hybrid vehicle and to be spaced apart from each other in a front-rear direction of the series hybrid vehicle, and a pair of side members arranged so as to extend in the front-rear direction of the series hybrid vehicle and to be spaced apart from each other in the width direction;
the one unit is the drive unit;
the other unit is the power generation unit;
the three locations at which the one unit is attached to the frame member include a location at which the drive unit is attached to the first cross member, a location at which the drive unit is attached to the second cross member, and a location at which the drive unit is attached to one side member out of the pair of side members;
the two predetermined locations at which the other unit is attached to the frame member include a location at which the power generation unit is attached to one of the first cross member and the second cross member and a location at which the power generation unit is attached to the other side member out of the pair of side members; and
the straight line is a line connecting a location at which the power generation unit is attached to one of the side members and the center of gravity.

* * * * *